(12) United States Patent
Kim

(10) Patent No.: US 12,065,143 B2
(45) Date of Patent: Aug. 20, 2024

(54) DRIVING CONTROL METHOD AND SYSTEM OF VEHICLE

(71) Applicant: HYUNDAI MOBIS CO., LTD., Seoul (KR)

(72) Inventor: Jeong Ku Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 144 days.

(21) Appl. No.: 17/407,415

(22) Filed: Aug. 20, 2021

(65) Prior Publication Data

US 2022/0063614 A1  Mar. 3, 2022

(30) Foreign Application Priority Data

Aug. 25, 2020 (KR) .................. 10-2020-0107333

(51) Int. Cl.
*B60W 50/00* (2006.01)
*B60W 10/18* (2012.01)
(Continued)

(52) U.S. Cl.
CPC ............ *B60W 30/12* (2013.01); *B60W 10/18* (2013.01); *B60W 10/20* (2013.01);
(Continued)

(58) Field of Classification Search
CPC ...... B60W 30/12; B60W 10/18; B60W 10/20; B60W 30/143; B60W 40/105; B60W 50/0097; B60W 50/0098; B60W 60/001; B60W 2556/10; B60W 2050/0031; B60W 2050/0088; B60W 10/04; B60W 10/184; B60W 10/22; B60W 30/18145; B60W 50/06; B60W 2050/0008; B60W 30/02; B60W 40/10; B60W 2520/06; B60W 2520/105; B60W 2520/14;
(Continued)

(56) References Cited

U.S. PATENT DOCUMENTS

| 4,919,444 A | * | 4/1990 | Leiber ................ B60G 21/0556 |
| | | | 280/5.511 |
| 5,483,446 A | * | 1/1996 | Momose ............. F16H 61/0213 |
| | | | 701/1 |

(Continued)

FOREIGN PATENT DOCUMENTS

| CN | 109591811 A | * | 4/2019 | ............... B60T 7/12 |
| DE | 102019216950 A1 | * | 5/2021 | ............ B62D 6/002 |

(Continued)

*Primary Examiner* — B M M Hannan
(74) *Attorney, Agent, or Firm* — NovoTechIP International PLLC

(57) ABSTRACT

Disclosed are a driving control method and system of a vehicle. The driving control system includes a target calculator configured to calculate a target control value regarding behavior of the vehicle based on driving information with which the vehicle will travel, a correction calculator configured to calculate a corrected control value regarding the behavior of the vehicle based on the driving information and behavior data of the vehicle depending on the driving information, and a controller configured to control driving of the vehicle based on the target control value calculated by the target calculator and the corrected control value calculated by the correction calculator.

10 Claims, 4 Drawing Sheets

(51) Int. Cl.
  *B60W 10/20* (2006.01)
  *B60W 30/12* (2020.01)
  *B60W 30/14* (2006.01)
  *B60W 40/105* (2012.01)
  *B60W 60/00* (2020.01)
  *G06N 3/02* (2006.01)

(52) U.S. Cl.
  CPC ........ *B60W 30/143* (2013.01); *B60W 40/105* (2013.01); *B60W 50/0097* (2013.01); *B60W 50/0098* (2013.01); *B60W 60/001* (2020.02); *G06N 3/02* (2013.01); *B60W 2556/10* (2020.02)

(58) Field of Classification Search
  CPC ........ B60W 2520/16; B60W 2520/18; B60W 2540/18; B60W 2720/103; G06N 3/02; G06N 3/045; G06N 3/084; G06N 3/08; B60Y 2300/02
  USPC .......................................................... 701/41
  See application file for complete search history.

(56) References Cited

U.S. PATENT DOCUMENTS

| | | | | |
|---|---|---|---|---|
| 5,566,072 | A * | 10/1996 | Momose | B60T 8/174 706/900 |
| 5,904,215 | A * | 5/1999 | Ikeda | B60T 8/174 180/170 |
| 10,435,036 | B2 * | 10/2019 | Prakah-Asante | G08B 21/0446 |
| 10,663,973 | B2 * | 5/2020 | Hashimoto | B60W 30/143 |
| 11,577,712 | B2 * | 2/2023 | Gutschi | B60T 17/221 |
| 11,866,067 | B2 * | 1/2024 | Choi | G06N 3/049 |
| 2009/0222156 | A1 * | 9/2009 | Krueger | B60W 20/13 701/22 |
| 2012/0221228 | A1 * | 8/2012 | Noumura | B60W 30/02 701/1 |
| 2012/0265404 | A1 * | 10/2012 | Kim | B62D 6/002 701/43 |
| 2013/0158830 | A1 * | 6/2013 | Kurumisawa | B60W 30/162 706/46 |
| 2013/0293395 | A1 * | 11/2013 | Ohama | G08G 1/166 340/904 |
| 2013/0317698 | A1 * | 11/2013 | Yoon | B62D 15/025 701/41 |
| 2013/0317719 | A1 * | 11/2013 | Ham | B60K 31/00 701/96 |
| 2015/0088335 | A1 * | 3/2015 | Lambert | G06N 7/01 701/1 |
| 2015/0149036 | A1 * | 5/2015 | You | B60W 30/12 701/1 |
| 2015/0224987 | A1 * | 8/2015 | Tachibana | G08G 1/166 701/1 |
| 2016/0107683 | A1 * | 4/2016 | Lee | B62D 7/159 701/41 |
| 2017/0036673 | A1 * | 2/2017 | Lee | A61B 5/165 |
| 2017/0066444 | A1 * | 3/2017 | Habu | G08G 1/166 |
| 2018/0012492 | A1 * | 1/2018 | Baldwin | G08G 1/0965 |
| 2018/0025636 | A1 * | 1/2018 | Boykin | G08G 1/096725 701/1 |
| 2018/0030674 | A1 * | 2/2018 | Hershberger | B60W 30/143 |
| 2018/0201271 | A1 * | 7/2018 | Ishioka | B60W 10/06 |
| 2018/0284790 | A1 * | 10/2018 | Ichikawa | B60W 30/14 |
| 2019/0193739 | A1 * | 6/2019 | Tokimasa | B60W 30/18163 |
| 2019/0369627 | A1 * | 12/2019 | Green | B61L 27/60 |
| 2019/0382021 | A1 * | 12/2019 | Niibo | B60W 10/20 |
| 2020/0055515 | A1 * | 2/2020 | Herman | G06V 20/56 |
| 2020/0070818 | A1 * | 3/2020 | Tominaga | B60W 10/20 |
| 2020/0094829 | A1 * | 3/2020 | Ohmura | B60W 30/143 |
| 2020/0180614 | A1 * | 6/2020 | Goto | B60W 30/095 |
| 2020/0238980 | A1 * | 7/2020 | Goto | B60W 30/18163 |
| 2020/0286199 | A1 * | 9/2020 | Maddipati | G01C 21/3438 |
| 2020/0307384 | A1 * | 10/2020 | Mendez Pineda | B60L 58/12 |
| 2020/0307551 | A1 * | 10/2020 | Horiguchi | B60W 30/02 |
| 2020/0317192 | A1 * | 10/2020 | Awane | B62D 15/025 |
| 2020/0353918 | A1 * | 11/2020 | Goto | B60W 30/095 |
| 2020/0369277 | A1 * | 11/2020 | Sugai | B60K 7/0007 |
| 2020/0371518 | A1 * | 11/2020 | Kang | G05D 1/0221 |
| 2021/0053569 | A1 * | 2/2021 | Censi | B60W 60/0013 |
| 2021/0124962 | A1 * | 4/2021 | Kim | G06V 10/82 |
| 2021/0152732 | A1 * | 5/2021 | Eki | H04N 23/66 |
| 2021/0188258 | A1 * | 6/2021 | Goto | G08G 1/16 |
| 2021/0188262 | A1 * | 6/2021 | Goto | B60W 30/0956 |
| 2021/0188356 | A1 * | 6/2021 | Goto | B62D 6/00 |
| 2021/0197720 | A1 * | 7/2021 | Houston | G06N 3/045 |
| 2021/0229697 | A1 * | 7/2021 | Lee | G05D 1/0011 |
| 2021/0302187 | A1 * | 9/2021 | Nagavalli | G01C 21/3407 |
| 2022/0011112 | A1 * | 1/2022 | Sakashita | B60T 7/22 |
| 2022/0041180 | A1 * | 2/2022 | Choi | G06N 3/045 |
| 2022/0144257 | A1 * | 5/2022 | Maeda | B60W 60/00272 |
| 2022/0185278 | A1 * | 6/2022 | Satoh | G06V 20/593 |
| 2022/0242449 | A1 * | 8/2022 | Sakayori | G06V 20/588 |
| 2023/0127230 | A1 * | 4/2023 | Molnar | B60W 10/20 701/23 |

FOREIGN PATENT DOCUMENTS

| | | | | |
|---|---|---|---|---|
| GB | 2554481 | A * | 4/2018 | ........ B60W 30/0956 |
| JP | 2010254184 | A * | 11/2010 | |
| KR | 20120022305 | A | 3/2012 | |
| KR | 101525897 | B1 * | 6/2015 | |
| KR | 20220019204 | A * | 2/2022 | |
| KR | 102525191 | B1 * | 4/2023 | |

* cited by examiner

DRIVING CONTROL METHOD AND SYSTEM OF VEHICLE

CROSS-REFERENCE TO RELATED APPLICATIONS

This application claims priority from Korean Patent Application No. 10-2020-0107333, filed on Aug. 25, 2020, in the Korean Intellectual Property Office, the disclosure of which is incorporated herein by reference in its entirety.

BACKGROUND OF THE INVENTION

1. Field of the Invention

The present invention relates to a driving control method and system of a vehicle, and more particularly, to stable driving control of an autonomous vehicle.

2. Discussion of Related Art

The auto industry of the present time proceeds to implementation of autonomous driving in which involvement of a driver in vehicle driving is minimized. An autonomous vehicle refers to a vehicle which autonomously determines a driving path by recognizing environments around the vehicle through external information sensing and processing functions during driving, and independently drives using its own power supply.

The autonomous vehicle is capable of autonomously traveling to a destination while preventing collision with obstacles present on the driving path thereof and adjusting a vehicle speed and a driving direction depending on the shape of a road, without operating a steering wheel, an accelerator pedal, a brake, etc. by a driver.

Concretely, the autonomous vehicle optimally determines the driving path and driving lane thereof by determining and correcting the position of the vehicle through map data and position information of facilities, controls its own driving so as not to deviate from the determined path and lane, and performs defensive driving and avoidance driving with respect to vehicles suddenly entering the diving path and lane of the autonomous vehicle or dangerous factors present on the driving path of the autonomous vehicle.

However, steering or acceleration/deceleration of the conventional autonomous vehicle is generally controlled depending on the conditions of a road, and thereby, resources and dynamic characteristics, which vary depending on vehicles, are not capable of being reflected.

In order to solve such a problem, technology in which the behavior of a vehicle is controlled through modeling configured such that characteristics of respective vehicle kinds are reflected, but such control causes instability due to disturbance which is difficult to predict and influences a behavior of the vehicle.

The above information disclosed in the Background section is only for enhancement of understanding of the background of the invention and should not be interpreted as conventional technology that is already known to those skilled in the art.

BRIEF SUMMARY OF THE INVENTION

Therefore, the present invention has been made in view of the above problems, and it is an object of the present invention to provide technology which controls driving of a vehicle by compensating for disturbance which is difficult to predict and influences a behavior of the vehicle.

In accordance with an aspect of the present invention, the above and other objects can be accomplished by the provision of a system for controlling driving of a vehicle configured to travel based on driving information, the system including a target calculator configured to calculate a target control value regarding a behavior of the vehicle based on driving information, a correction calculator configured to calculate a corrected control value regarding the behavior of the vehicle based on the driving information and behavior data of the vehicle depending on the driving information, and a controller configured to control driving of the vehicle based on the target control value calculated by the target calculator and the corrected control value calculated by the correction calculator.

The driving information may include a driving path depending on a plurality of positions in longitudinal and lateral directions in which the vehicle is travelling, and a speed profile of the vehicle.

The target calculator may calculate a target value of a steering angle, a steering angular velocity, an acceleration of the vehicle or a braking of the vehicle as the target control value regarding the behavior of the vehicle.

The driving control system may further include a predictor configured to predict the behavior of the vehicle based on the driving information of the vehicle, and the target calculator may calculate the target control value based on the behavior of the vehicle predicted by the predictor.

The correction calculator may include a deep neural network trained based on previously input driving information and previously input behavior data of the vehicle depending on the corresponding driving information.

The correction calculator may use the driving information, including a driving path depending on a plurality of positions in longitudinal and lateral directions, in which the vehicle is travelling, and a speed profile of the vehicle, as an input.

The correction calculator may use the behavior data including a steering angle, a rotational angle (in a roll, pitch or yaw direction), or speed data of the vehicle depending on the corresponding driving information, as an input.

The correction calculator may calculate a corrected control value of a steering angle or a rotational angle of the vehicle as an output.

The controller may control a steering apparatus, a driving apparatus, a braking apparatus or suspension apparatuses of the vehicle based on the target control value and the corrected control value.

In accordance with another aspect of the present invention, there is provided a method for controlling driving of a vehicle configured to travel based on driving information, the driving control method including calculating a target control value regarding a behavior of the vehicle based on driving information with which the vehicle is travelling, calculating a corrected control value regarding the behavior of the vehicle based on the driving information and behavior data of the vehicle depending on the driving information, and controlling driving of the vehicle based on the calculated target control value and the calculated corrected control value.

The driving information may include a driving path depending on a plurality of positions in longitudinal and lateral directions in which the vehicle is travelling, and a speed profile of the vehicle.

In the calculating the target control value, a target value of a steering angle, a steering angular velocity, an acceleration of the vehicle or a braking of the vehicle may be calculated as the target control value regarding the behavior of the vehicle.

The driving control method may further include predicting the behavior of the vehicle based on the driving information of the vehicle, prior to the calculating the target control value, and, in the calculating the target control value, the target control value may be calculated based on the predicted behavior of the vehicle.

In the calculating the corrected control value, a deep neural network trained based on previously input driving information and previously input behavior data of the vehicle depending on the corresponding driving information may be used.

In the calculating the corrected control value, the driving information, including a driving path depending on a plurality of positions in longitudinal and lateral directions, in which the vehicle is travelling, and a speed profile of the vehicle, may be used as an input.

In the calculating the corrected control value, the behavior data, including a steering angle, a rotational angle (in a roll, pitch or yaw direction), or speed data of the vehicle depending on the corresponding driving information, is used as an input.

In the calculating the corrected control value, a corrected control value of a steering angle or a rotational angle of the vehicle may be used as an output.

In the controlling driving of the vehicle, a steering apparatus, a driving apparatus, a braking apparatus or suspension apparatuses of the vehicle may be controlled based on the target control value and the corrected control value.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
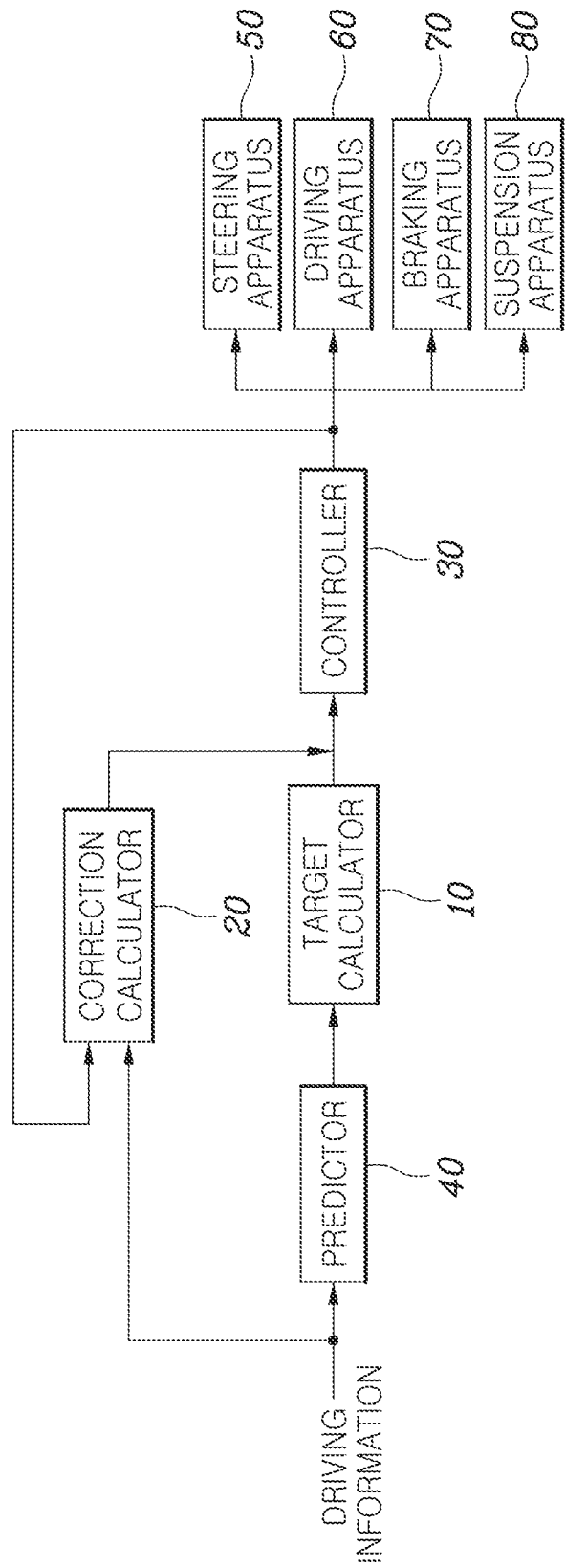
FIG. 1 is a block diagram of a driving control system of a vehicle according to one embodiment of the present invention.

Specific structural or functional descriptions in embodiments of the present invention set forth in the description which follows will be exemplarily given to describe the embodiments of the present invention. However, the present invention may be embodied in many alternative forms, and should not be construed as being limited to the embodiments set forth herein.

The embodiments of the present invention may be variously modified and changed, and thus specific embodiments of the present invention will be illustrated in the drawings and described in detail in the following description of the embodiments of the present invention. However, it will be understood that the embodiments of the present invention are provided only to completely disclose the invention and cover modifications, equivalents or alternatives which come within the scope and technical range of the invention.

In the following description of the embodiments, terms, such as "first" and "second", are used only to describe various elements, and these elements should not be construed as be limited by these terms. These terms are used only to distinguish one element from other elements. For example, a first element described hereinafter may be termed a second element, and similarly, a second element described hereinafter may be termed a first element, without departing from the scope of the invention.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

The terminology used herein is for the purpose of describing particular embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Unless defined otherwise, all terms including technical and scientific terms used in the following description have the same meanings as those of terms generally understood by those in the skill in the art. Terms defined in generally used dictionaries will be interpreted as having meanings coinciding with contextual meanings in the related technology, and are not to be interpreted as having ideal or excessively formal meanings unless defined clearly in the description.

Hereinafter, reference will be made in detail to exemplary embodiments of the present invention, examples of which are illustrated in the accompanying drawings and described below. In the drawings, the same or similar elements are denoted by the same reference numerals even when they are depicted in different drawings.

Figure 2:
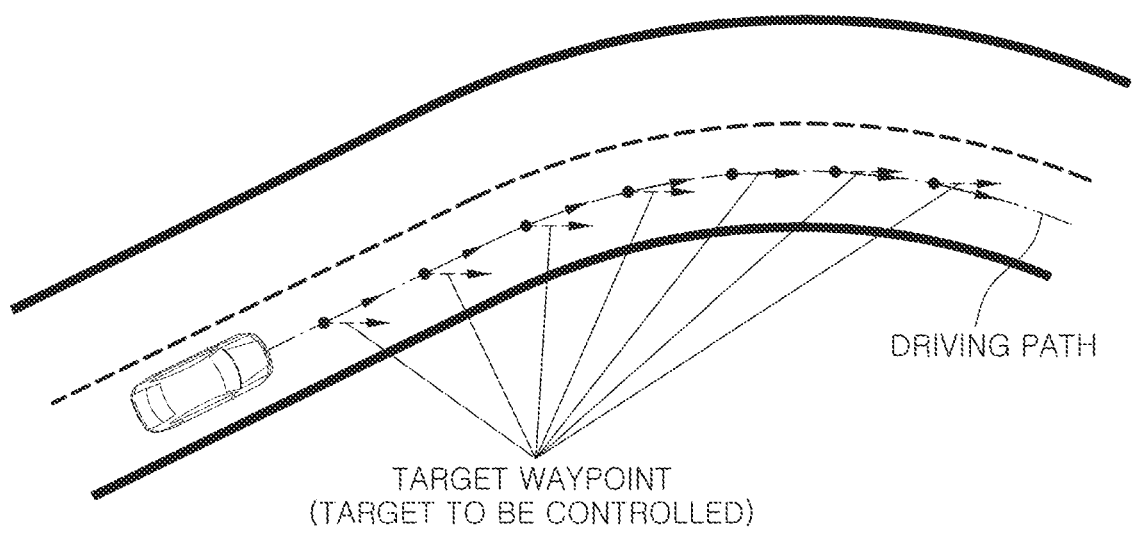
FIG. 2 is a view illustrating the behavior of a vehicle which tracks a driving path according to one embodiment of the present invention.

FIG. 1 is a block diagram of a driving control system of a vehicle according to one embodiment of the present invention, and FIG. 2 is a view illustrating the behavior of a vehicle which tracks a driving path according to one embodiment of the present invention.

Referring to FIGS. 1 and 2, a system for controlling driving of a vehicle configured to travel based on driving information according to one embodiment of the present invention includes a target calculator 10 configured to calculate a target control value regarding the behavior of the vehicle based on the driving information with which the vehicle is travelling, a correction calculator 20 configured to calculate a corrected control value regarding the behavior of the vehicle based on the driving information and behavior data of the vehicle depending on the driving information, and a controller 30 configured to control driving of the vehicle based on the target control value calculated by the target calculator 10 and the corrected control value calculated by the correction calculator 20.

Figure 4:
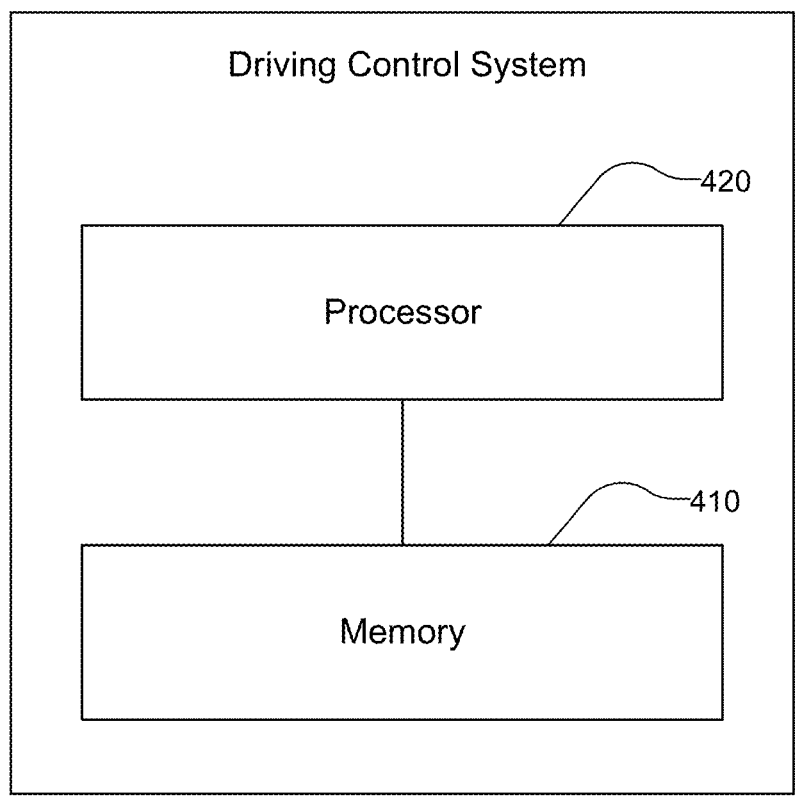
FIG. 4 is another block diagram of the driving control system of the vehicle according to an embodiment of the present invention.

The target calculator 10, the correction calculator 20, the controller 30 and a predictor 40 according to one exemplary embodiment of the present invention may be implemented through a non-volatile memory (shown as memory 410 in FIG. 4) configured to store an algorithm configured to control operations of various elements of the vehicle or data regarding software commands for reproducing the algorithm and a processor (shown as processor 420 in FIG. 4) configured to perform operations which will be described below using data stored in the corresponding memory 410. The memory 410 and the processor 420 may be implemented as individual chips. Alternatively, the memory 410 and the processor 420 may be implemented as a single integrated chip. Here, the processor 420 may be provided in the form of one or more processors.

The target calculator 10 may calculate the target control value regarding the behavior of the vehicle based on the driving information of the vehicle input to the target calculator 10. Here, the driving information of the vehicle may be information regarding expected driving of the vehicle through autonomous driving or an advanced driver assistance system (ADAS).

For example, the driving information of the vehicle may be generated based on road information sensed by sensors, for example, camera sensors, radar sensors, ultrasonic sensors, lidars, or the like, which are mounted in the vehicle, and a set path of the vehicle. That is, the driving information of the vehicle with which the vehicle is expected to drive may be set depending on a path along which the vehicle is expected to drive and the road information.

The target calculator 10 may calculate the target control value regarding the behavior of the vehicle. Here, the target control value may be a target value configured to control an apparatus, such as a driving apparatus, a braking apparatus, a steering apparatus or suspension apparatuses, included in the vehicle so as to change the behavior of the vehicle.

The controller 30 controls driving of the vehicle based on the target control value calculated by the target calculator 10. Thereby, the behavior of the vehicle in the longitudinal and lateral directions is controlled, stability against rapid acceleration and deceleration, steering or rotation of the vehicle is improved, and thus, safety of the vehicle is secured.

Particularly, the controller 30 according to the present invention may reflect the corrected control value calculated by the correction calculator 20.

The correction calculator 20 may calculate the corrected control value regarding the behavior of the vehicle based on the driving information input to the correction calculator 20. Concretely, the correction calculator 20 may calculate a corrected control value depending on newly input driving information using previously input driving information and behavior data of the vehicle depending on the previously input driving information.

Therefore, disturbances occurring in the behavior of the vehicle depending on the target control value calculated by existing modeling may be compensated for. Particularly, disturbances to the behavior of the vehicle may be caused by unpredicted reasons, such as an assembly tolerance of the vehicle, frictional force introduced from the outside, etc.

More particularly, the driving information may include the driving path of the vehicle depending on a plurality of positions in the longitudinal and lateral directions in which the vehicle is travelling, and the speed profile of the vehicle.

The driving path may be set based on the a plurality of positions in the longitudinal and lateral directions in which the vehicle is travelling, using the shapes of roads and lanes recognized by the sensors, lane change information determined from navigation information, etc.

Further, the speed profile of the vehicle may be set based on obstacles (for example, vehicles, motorcycles, pedestrians, etc.) around the vehicle or the shapes of roads, speed limits, etc.

The target calculator 10 may calculate the target value of a steering angle, a steering angular velocity, an acceleration of the vehicle or a braking of the vehicle as the target control value regarding the behavior of the vehicle.

Concretely, the target value of the steering angle or the steering angular velocity may be a target control value configured to control a motor driven power steering (MDPS) apparatus 50, which controls a steering wheel, and the target value of an acceleration or braking of the vehicle may be a target control value configured to control a driving apparatus 60, such as an engine or a motor, or a braking apparatus 70.

In addition, the driving control system according to one embodiment of the present invention may further include the predictor 40 configured to predict the behavior of the vehicle based on the driving information of the vehicle, and the target calculator 10 may calculate the target control value based on the behavior of the vehicle predicted by the predictor 50.

The predictor 40 may predict the behavior of the vehicle based on the driving information of the vehicle, and concretely, may predict the behavior of the vehicle, such as the position, rotational angle (in the roll, pitch or yaw direction), and speed of the vehicle, using the driving path and the speed profile of the vehicle.

The target calculator 10 may calculate the target value of the steering angle, the steering angular velocity, an acceleration of the vehicle or a braking of the vehicle based on the behavior of the vehicle predicted by the predictor 40.

Concretely, the correction calculator 20 may include a deep neural network (DNN) trained based on previously input driving information and previously input behavior data of the vehicle depending on the corresponding driving information.

The deep neural network (DNN) includes an input layer, an output layer, and hidden layers between the input layer and the output layer. When specific input data is given, a weight between the input data and output data (i.e., a label) is adjusted. A connection link between nodes includes the weight.

The structure of the deep neural network (DNN) will be expressed as the following equation.

$$v = W \cdot x + b$$

Here, x is an input, W is a weight, and b is a bias value.

In an activation function, the calculated value of v is regarded as an output y. The activation function may employ a sigmoid function, a SoftMax function, a rectified linear unit (ReLU) function or the like.

A vanishing gradient, which is a problem of a backpropagation algorithm, may be solved by applying the ReLU function. In the ReLU function, the node output of a neural network may exceed 1, thereby solving the vanishing gradient.

In the ReLU function, $$\emptyset(v) = \max(x, 0) = \begin{pmatrix} x, & x > 0 \\ 0, & x \leq 0 \end{pmatrix}.$$

thereby, $$\emptyset'(v) = \begin{pmatrix} 1, & x > 0 \\ 0, & x \le 0 \end{pmatrix}.$$

Further, overfitting, which is another problem of the backpropagation algorithm, means a situation that corresponds too closely or exactly to an input value. One of solutions to overfitting is dropout which is a regularization technique. In dropout, the entirety of a neural network is not trained, and some nodes are randomly selected and trained. In general, the dropout rate of hidden layers is 50%, and the dropout rate of input nodes is 25%.

The key to the backpropagation algorithm is to update a weight of a neural network by reflecting the error of a previous result. That is, the weight is adjusted by repeatedly executing a learning rule so as to reduce the error. Concretely, this will be expressed as the following equation.

$$W_n = w_{n-1} + \Delta w = w_{n-1} + \eta \cdot e \cdot x$$

Here, w is a weight, η is a learning rate (in the range of 0 to 1), e is an error (d−y, d being a label and y being an output), and x is an input.

This equation will be represented as the following general equation.

$$w_n = w_{n-1} + \eta \cdot \emptyset'(v) \cdot x = w_{n-1} + \eta \cdot \delta \cdot x$$

When the sigmoid function is used, δ=Ø'(v) will be expressed as follows.

$$\delta = \emptyset(v) \cdot (1 - \emptyset(v)) \cdot e$$

The convolutional neural network (CNN), which is a kind of deep neural network, includes one or more convolutional layers, pooling layers, and fully connected layers.

Particularly, the convolutional neural network (CNN) has a structure appropriate for learning of two-dimensional data, and may be trained through the backpropagation algorithm. In the convolutional neural network (CNN), feature extraction using a feature extractor configured to extract features of learning data is included in a neural network learning process so as to be collectively processed, and the weight of a feature extraction neural network is determined through learning.

A raw image input to the convolutional neural network (CNN) passes through the feature extraction neural network located at a front position. An image feature map extracted by the feature extraction neural network is input again to a classification neural network located at a rear position. The classification neural network classifies a final image category based on image features.

CNN learning model: Image—Conv—ReLU—Pool—Deep Neural Network (ReLU—SoftMax)→label The convolution layer converts an input image through convolution. The convolution layer serves as a digital filter (convolution filter). The pooling layer forms one representative pixel by pooling surrounding pixels. The pooling layer serves to reduce the number of the dimensions of the image. Pooling serves to compensate for one-sided deviation or a target in the input image to be recognized.

The correction calculator 20 may use the driving information including the driving path depending on the a plurality of positions in the longitudinal and lateral directions in which the vehicle is travelling, and the speed profile of the vehicle, as an input.

Further, the correction calculator 20 may use behavior data including the steering angle, rotational angle (in the roll, pitch or yaw direction), or speed data of the vehicle depending on the corresponding driving information, as an input.

The correction calculator 20 may calculate the corrected control value of the steering angle or rotational angle of the vehicle, as an output.

That is, the correction calculator 20 may be trained by receiving the input driving path and the input behavior data of the vehicle depending on the input driving path. Particularly, the weight, which is included in the deep neural network by learning, may be varied through learning.

The correction calculator 20, i.e., the deep neural network which is trained using the previously input driving information and behavior data, may calculate the corrected control value regarding the behavior of the vehicle based on a newly input driving path.

The controller 30 may control the steering apparatus 50, the driving apparatus 60, the braking apparatus 70 or suspension apparatuses 80 based on the target control value and the corrected control value.

That is, the controller 30 may control the steering apparatus 50, the driving apparatus 60, the braking apparatus 70 or the suspension apparatuses 80 by reflecting the corrected control value in the target control value regarding the behavior of the vehicle.

The steering apparatus 50 may be the motor driven power steering (MDPS) apparatus, which controls the steering wheel of the vehicle, and the behavior of the vehicle in the yaw direction may be controlled by controlling operation of the MDPS apparatus.

The suspension apparatus 80 may be a shock absorber which is disposed on a wheel of the vehicle so as to reduce vibration introduced from the wheel of the vehicle, and the behavior of the vehicle in the vertical direction, particularly, the behavior of the vehicle in the roll direction or the pitch direction, may be controlled by controlling elasticity or damping of the shock absorber.

The driving apparatus 60 and the braking apparatus 70 may control acceleration and deceleration of the vehicle, thereby being capable of controlling the speed of the vehicle to track the set speed profile.

Figure 3:
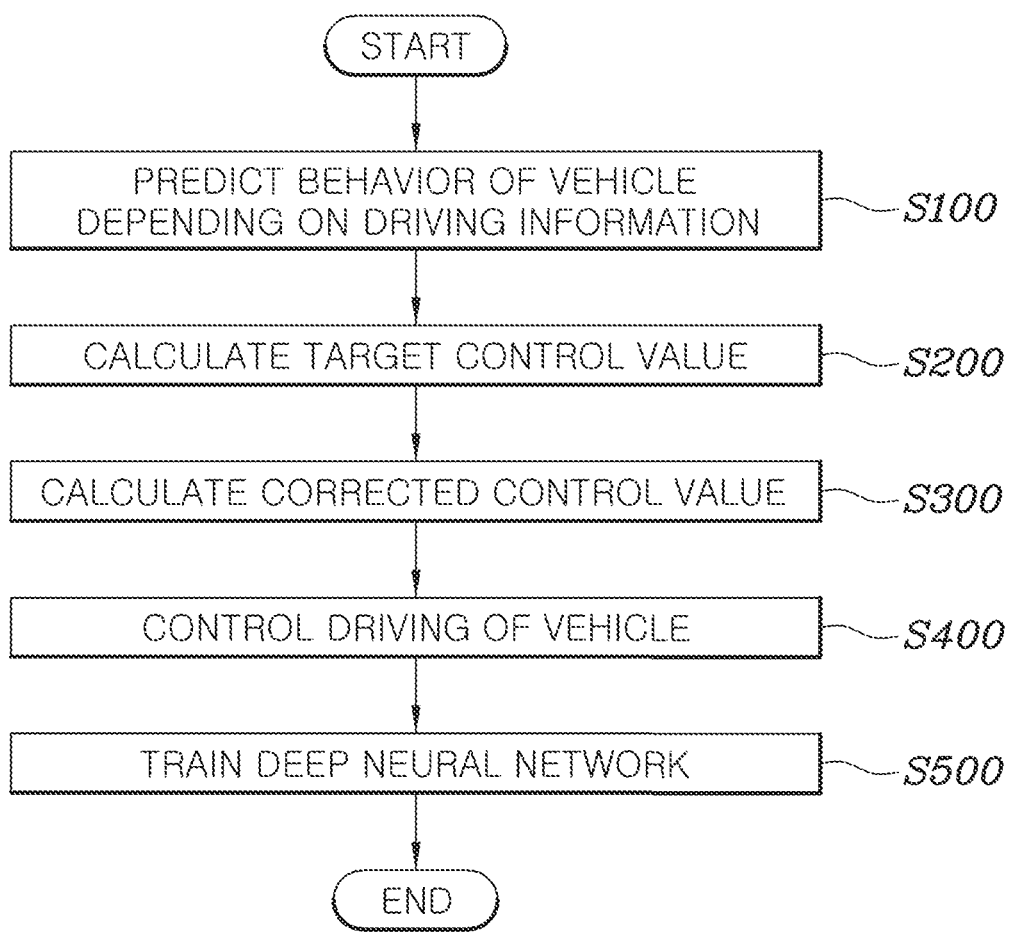
FIG. 3 is a flowchart illustrating a driving control method of a vehicle according to one embodiment of the present invention.

FIG. 3 is a flowchart illustrating a driving control method of a vehicle according to one embodiment of the present invention.

Referring to FIG. 3, a method of controlling driving of a vehicle configured to travel based on driving information according to one embodiment of the present invention includes calculating a target control value regarding the behavior of the vehicle based on the driving information with which the vehicle is travelling (S200), calculating a corrected control value regarding the behavior of the vehicle based on the driving information and behavior data of the vehicle depending on the driving information (S300), and controlling driving of the vehicle based on the calculated target control value and the calculated corrected control value (S400).

The driving information of the vehicle may include the driving path of the vehicle depending on a plurality of positions in the longitudinal and lateral directions in which the vehicle is travelling, and the speed profile of the vehicle.

In calculation of the target control value (S200), the target value of the steering angle, the steering angular velocity, an acceleration of the vehicle or a braking of the vehicle may be calculated as the target control value regarding the behavior of the vehicle.

The driving control method according to one embodiment of the present invention may further include predicting the behavior of the vehicle based on the driving information of the vehicle (S100), prior to calculation of the target control value (S200), and, in calculation of the target control value (S200), the target control value may be calculated based on the predicted the behavior of the vehicle.

In calculation of the corrected control value (S300), a deep neural network (DNN) trained based on previously input driving information and previously input behavior data of the vehicle depending on the corresponding driving information may be used.

In calculation of the corrected control value (S300), the driving information including the driving path based on the a plurality of positions in the longitudinal and lateral directions in which the vehicle is travelling, and the speed profile of the vehicle may be used as an input.

In calculation of the corrected control value (S300), the behavior data including the steering angle, rotational angle (in the roll, pitch or yaw direction), or speed data of the vehicle depending on the corresponding driving information may be used as an input.

In calculation of the corrected control value (S300), the corrected control value of the steering angle or the rotational angle of the vehicle may be calculated as an output.

In control of driving of the vehicle (S400), the steering apparatus 50, the driving apparatus 60, the braking apparatus 70 or the suspension apparatuses 80 of the vehicle may be controlled based on the target control value and the corrected control value.

The driving control method according to one embodiment of the present invention may further include training the deep neural network (DNN) based on driving information input to the controller 30 and behavior data of the vehicle depending on the corresponding driving information (S500), after control of driving of the vehicle (S400).

As is apparent from the above description, a driving control method and system of a vehicle according to the present invention may secure robustness to disturbance introduced from the outside.

Thereby, stability in driving control of the vehicle is improved, and thus, safety of the vehicle may be ensured.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for controlling driving of a vehicle, comprising:
   a processor; and
   a computer-readable medium storing executable instructions which, when executed by the processor, causes the processor to control the system to perform:
   generating, based on driving information of the vehicle, a target control value affecting a behavior of the vehicle in a vertical direction, wherein the driving information comprises a driving path and a speed profile of the vehicle;
   inputting, to a deep neural network (DNN), previous driving information and previous behavior data of the vehicle, the DNN trained to generate, based on the previous driving information and previous behavior data of the vehicle, a corrected control value affecting the behavior of the vehicle in the vertical direction; and
   controlling, based on the target control value and the corrected control value, a suspension apparatus of the vehicle,
   wherein the suspension apparatus includes a shock absorber configured to reduce vibration from a wheel of the vehicle, and the target control value and the corrected control value are used for controlling elasticity or damping of the shock absorber.

2. The system of claim 1, wherein the driving information comprises a driving path and a speed profile of the vehicle.

3. The system of claim 1, wherein the target control value comprises at least one of a steering angle, a steering angular velocity, a vehicle acceleration-related value, and a vehicle braking-related value.

4. The system of claim 1, wherein the previous behavior data comprises at least one of a previous steering angle, a previous rotational angle, and previous speed data of the vehicle.

5. The system of claim 1, wherein the corrected control value comprises at least one of a steering angle and a rotational angle of the vehicle.

6. A method of controlling driving of a vehicle, comprising:
   generating, based on driving information of the vehicle, a target control value affecting a behavior of the vehicle in a vertical direction, wherein the driving information comprises a driving path and a speed profile of the vehicle;
   inputting, to a deep neural network (DNN), previous driving information and previous behavior data of the vehicle, the DNN trained to generate, based on the previous driving information and previous behavior data of the vehicle, a corrected control value affecting the behavior of the vehicle in the vertical direction, and
   controlling, based on the target control value and the corrected control value, a suspension apparatus of the vehicle,
   wherein the suspension apparatus includes a shock absorber configured to reduce vibration from a wheel of the vehicle, and the target control value and the corrected control value are used for controlling elasticity or damping of the shock absorber.

7. The method of claim 6, wherein the driving information comprises a driving path and a speed profile of the vehicle.

8. The method of claim 6, wherein the target control value comprises at least one of a steering angle, a steering angular velocity, a vehicle acceleration-related value, and a vehicle braking-related value.

9. The method of claim 6, wherein the previous behavior data comprises at least one of a previous steering angle, a previous rotational angle, and previous speed data of the vehicle.

10. The method of claim 6, wherein the corrected control value comprises at least one of a steering angle and a rotational angle of the vehicle.

* * * * *